United States Patent Office 3,039,967
Patented June 19, 1962

3,039,967
NON-SQUAWKING AUTOMATIC TRANSMISSION FLUID
Clemence J. Henry, Newburgh, and Raymond B. Tierney, Wappingers Falls, N.Y., assignors to Texaco Inc., a corporation of Delaware
No Drawing. Filed May 14, 1957, Ser. No. 658,942
11 Claims. (Cl. 252—75)

This invention relates to a compounded mineral lubricating oil and, more particularly, to a hydraulic fluid adapted for use in the automatic transmissions of motor vehicles.

In the simple fluid drive or torque converter, the hydraulic fluid is required mainly to transmit torque and to function as a heat transfer medium. However, in the more complicated automatic transmissions which have, in addition to a fluid coupling or a torque converter, wet clutches, planetary gearing and hydraulic control mechanism, additional problems of adequate lubrication are also involved. Rigorous requirements have been set up to qualify a hydraulic fluid for this service. These requirements include a viscosity index of at least 132 to provide improved operation over a wider temperature range and to insure that a single fluid can be used in all current production automatic transmissions, a flash point of 320° F. minimum, a fire point of 355° F. minimum and a pour point of —45° F. maximum to insure pumpability of the fluid at low atmospheric temperatures. In addition, the fluid must not have a detrimental effect on copper alloys as determined by its ability to pass a copstrip corrosion test; it must have no deleterious effect on the synthetic seals used in automatic transmissions; and it must have a high degree of oxidation resistance and be able to withstand prolonged heating at high temperatures without decomposition. Finally, the fluid must possess excellent anti-frictional properties involving oiliness and extreme pressure characteristics to afford proper lubrication of the gearing, clutch plates and other parts of the automatic transmissions.

As a measure of the ability of the hydraulic fluid to afford proper operation in the automatic transmission, several severe tests have been formulated. Thus, one of the requirements is that the fluid should pass the CRC L-4 Oxidation Test at 265° F. crankcase temperature. Another requirement is that the fluid pass a socalled non-chatter or squawk test, which means that the fluid functions in the automatic transmission without objectionable chatter or squawking. The latter is a highpitched sound produced by a "stick-slip" phenomenon of the clutch plates, particularly in the second-third upshift. A third rigorous requirement is that the fluid should pass a so-called cycling test, which involves operation in the automatic transmission through repeated cycles of idling to full throttle at a transmission oil temperature of 275° F. over a substantial period of time, without substantial deposition of sludge or varnish formation and without injury to the clutch plates.

It has been found that a great variety of additives or inhibitors, which are generally effective in motor oil service in preventing oil oxidation and corrosion and imparting other desirable qualities, either cannot be employed for the present service because the compounded mineral lubricating oil will then not meet the requirements for viscosity, viscosity index and pour point, or are ineffective in the present service because they do not suppress the squawk and/or actually increase the amount of sludge formed and the amount of deposits on the clutch plates of the automatic transmission. Moreover, the requirements for additives which satisfactorily suppress the squawking tendency and afford suitable operation in the cycling test are quite different from those involved in ordinary crankcase lubrication or diesel motor oil service. The problem, therefore, was not that of selection of known additives for their expected results, but involved entirely new requirements in a nonanalogous field.

In accordance with the present invention, it has been discovered that a dialkyl ester of a dimer formed from two unsaturated monocarboxylic aliphatic acids, both of which contain 12 to 24 carbon atoms and at least one of which contains a conjugated diolefinic group, is an excellent anti-squawk agent. The hydraulic transmission fluid of the invention comprises at least 85 weight percent of a mineral lubricating oil and 0.1 to 1.0 weight percent of a dialkyl ester of a dimer acid obtained by polymerization of two $C_{12}$ to $C_{24}$ ethylenic monocarboxylic aliphatic acids, at least one of which contains a conjugated diolefinic group. The finished automatic transmission fluid of the invention also contains 5 to 12 weight percent of other additives to impart improved viscosity index, anti-corrosive and detergent properties thereto. A silicone polymer foam inhibitor is also usually present in the finished commercial product.

The mineral lubricating oil which constitutes at least 85 weight percent of the composition is a refined oil or a mixture of refined oils selected according to the viscosity requirements of the particular service. For automatic transmissions where the requirements include and SUS viscosity of the compounded oil at 210° F. of 49 to 51 minimum and at 0° F. of 7,000 maximum (extrapolated), the base oil or the major component thereof is generally a distillate oil lighter than an SAE 10 grade motor oil such as one having an SUS viscosity at 100° F. less than 150 and generally between about 50 and 125. The distillate fraction can be a refined paraffinic distillate, a refined naphthenic distillate, or a mixture thereof. The flash point of the distillate component of the base oil will generally be substantially above 300° F.; if the distillate fraction constitutes the entire base oil, its flash point will usually be above 375° F.

A particularly preferred base oil comprises approximately 60 to 90 percent of a refined distillate oil and 10 to 40 percent of a refined residual fraction which imparts desired high flash point and lubricity to the base oil. A particularly preferred residual fraction comprises a paraffin base residium which has been propane deasphalted and subjected to centrifuge dewaxing and which has an SUS at 210° F. below about 250. An effective base oil mixture comprises 48 percent of a furfural refined, acid-treated, clay-contacted, solvent dewaxed paraffin base distillate having an SUS at 100° F. of 100, a viscosity index about 100, a flash above 385° F., and a pour below 0° F., 32 percent of an acid-treated naphthenic base distillate having an SUS at 100° F. of 60, a flash above 300° F. and a pour below —40° F., and 20 percent of a paraffin base residuum which has been propane deasphalted, centrifuge dewaxed, and clay-contacted, and which has an SUS viscosity at 210° F. of 160, a flash above 540° F., and a pour of 0° F. This base oil mixture has a flash above 350° F., a pour substantially below —5° F., an SUS viscosity at 100° F. of 137, and a viscosity index of 89.

The dialkyl esters of dimer acids which impart improved anti-squawk properties of automatic transmission fluids have the following general formula:

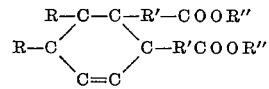

wherein R is a monovalent aliphatic hydrocarbon radical containing 4 to 10 carbon atoms, R' is a divalent aliphatic hydrocarbon radical containing 4 to 10 carbon atoms, and R" is a monovalent aliphatic hydrocarbon radical containing 1 to 10 carbon atoms. The dimer acids from which the dialkyl esters of the foregoing general formula are obtained are derived from reaction of two $C_{12}$ to $C_{24}$ ethylenic monocarboxylic aliphatic acids, at least one of which contains a conjugated diolefinic group. Although dimer acids may be formed by the reaction of a monoethylenic acid such as oleic with a conjugated polyethylenic acid such as linoleic acid, dimer acids are usually formed by polymerization of two polyolefinic acids.

Polyethylenic conjugated acids useful in the preparation of the dimer acids of the invention are linoleic acid, linolenic acid and 13,15-docosadienoic acid. Monoethylenic aliphatic monocarboxylic acids which can be reacted with polyethylenic acids to form dimer acids are 4-dodecenoic acid, myristoleic acid, palmitoleic acid, erucic acid and oleic acid. The conjugated polyethylenic aliphatic monocarboxylic acids and monoolefinic carboxylic acids employed to form dimer acids can be obtained by hydrolysis of vegetable oils such as soy bean oil, linseed oil, cottonseed oil, corn oil, castor oil, mustard seed oil, and peanut oil.

Alkyl esters for linoleic acid dimer are the preferred anti-squawk agents for use in the automatic transmission fluids of the invention. The dialkyl esters of linoleic acid dimer have the following formula:

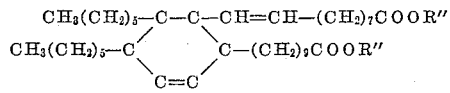

wherein R" is an aliphatic hydrocarbon radical containing 1 to 10 carbon atoms. On the basis of both availability and performance, dibutyl dilinoleate is the preferred anti-squawk agent. Examples of other dimer acid esters effective as antisquawk agents in the automatic transmission fluids are the following: dimethyl dilinoleate, diethyl dilinoleate, di-2- ethylhexyl dilinoleate, the dihexyl ester of the dimer of 13,15-docosadienoic acid, the dimethyl ester of the dimer of myristoleic and linolenic acids and the dibutyl ester of the dimer of oleic and linolenic acids.

These dimer acid esters are commercially available products and are prepared by known methods. One method broadly comprises esterifying the prescribed type of olefinic fatty acids with an alcohol in the presence of an alkali metal alcoholate at mild reaction temperatures for a period of several hours, the resulting esters are distilled and then polymerized by heating to about 300° C. in the presence of a polymerization catalyst, such an anthraquinone, benzoyl peroxide, borontrifluoride, etc. for about 8 to 30 hours. This treatment results in a polymerized fatty acid ester consisting essentially of the dimer along with small portions of trimer, and higher polymerized esters and containing a small amount of monomer. Glycerides have also been heat polymerized to form products containing dimer esters although the yield is comparatively small.

Another method of preparing the dimer acid ester of the invention comprises first obtaining the dimer acids and esterifying them with the desired alcohol. Briefly, the method entails steam heating unsaturated fatty acids in a pressure vessel at temperatures from 260 to 360° C. for about 3 to 10 hours to produce a polymerized product mainly consisting of a dimer acid. The dimer acid is separated by distillation from the product and is then esterified by direct reaction with the desired alcohol.

The dialkyl esters of dimer acids are employed in a concentration between 0.1 and 1.0 and preferably between 0.15 and 0.5 weight percent in order to eliminate squawk without adversely affecting the other necessary properties of the automatic transmission fluid. At a concentration below 0.1 weight percent, the dialkyl ester of the dimer acid is ineffective as an anti-squawk agent, whereas at concentrations above the prescribed 1.0 weight percent, the resulting transmission fluid fails in the cycling test because of excess slippage. When the concentration of the dialkyl ester of a dimer acid is within the prescribed 0.1 to 1.0 weight percent range, the resulting transmission fluid has good squawk hating and it easily passes the cycling test.

Viscosity index improvement of the transmission fluid of the invention is usually effected with a methacrylate ester polymer having the formula:

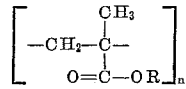

wherein R is an alkyl group or a mixture of alkyl groups containing from 4 to 20 carbon atoms, and $n$ is a number providing a molecular weight of the polymer of about 10,000 to 20,000. Various methacrylate ester polymers of this type are known which possess pour depressant and viscosity index improving properties. A very satisfactory material of this type is a copolymer of the lower $C_4$ to $C_{14}$ alkyl methacrylate esters. A commercial methacrylate copolymer of this type, which is primarily a viscosity index improver, is sold under the trade name "Acryloid 710" by Rohm & Haas, wherein R comprises about 50 percent lauryl and 50 percent octyl groups and the molecular weight is about 10,000 to 20,000.

Another commercial material of this type is sold by the same concern under the trade name "Acryloid 150," wherein R is predominantly a mixture of 50 percent cetyl, 25 percent lauryl and 25 percent octyl groups and the molecular weight of the polymer is about 10,000 to 15,000. The latter copolymer predominates in four depressant properties. Each of these commercial methacrylate copolymers is sold in the form of about a 40 percent concentrate of the active polymer in a light colored mineral lubricating oil base, providing a clear amber colored viscous liquid having a kinematic viscosity at 210° F. of about 600 to 850 centistokes. In the following description, the copolymer will be listed on an oil-free basis, except where the trade names of commrcial products are specified.

One or more of the methacrylate ester polymers, as described above, may be employed with the base oil in a proportion of about 0.4 to 6.0 percent by weight based on the hydraulic oil composition, in order to impart the desired viscosity, viscosity index and pour point. For example, "Acryloid 710" may be employed alone with very satisfactory results with certain base oils; and, in other cases, a mixture of "Acryloid 710" and "Acryloid 150" may be used. Also it will be understood that other methacrylate ester polymers of the foregoing type can be employed.

The present hydraulic fluids also preferably include a suitable anti-foam agent, since hydraulic fluids are circulated rapidly in operation and air may be entrapped. For this purpose, a silicone polymer of high viscosity, such as dimethyl silicone polymer having a kinematic viscosity at 25° C. of about 1,000 centistokes and above, is preferably employed, since this agent also desirably increases the flash point of the fluid. The use of a high viscosity silicone polymer in a hydraulic fluid of the mineral lubricating oil type to inhibit foaming and increase the flash point is disclosed in U.S. Patent No. 2,662,055. A silicone polymer is conveniently employed in the form of a concentrate in a hydrocarbon solvent such as kerosene. For example, a very satisfactory antifoam agent for this purpose is prepared by diluting 10 grams of a dimethyl silicone polymer (1,000 centistokes at 25° C.) with kerosene to bring the volume to 100 cubic centimeters. A proportion of the order of 0.005 to 0.025 percent by weight of the immediately foregoing concentrate is ordinarilly employed, preferably sufficient to provide about 50 to 200 parts per million of the silicone polymer concentrate on the basis of the hydraulic fluid.

The detergents employed in the finished automatic transmission fluids are usually alkaline earth metal salts of petroleum sulfonates or alkaryl sulfonates, both of which are widely used in lubricants because of their detergent action. As is well known, the petroleum sulfonate divalent metal salts are formed by reaction of concentrated sulfuric acid (90 percent minimum) with a high boiling hydrocarbon fraction in the lubricating oil range, and subsequent neutralization of the resulting petroleum sulfonate fraction with a divalent metal carbonate or hydroxide. The alkaline earth metal salts of alkylated aromatic sulfonic acids are formed by alkylating a suitable aromatic compound such as benzene, alkyl benzene, naphthalene, alkyl naphthalene and anthracene, with an olefin in the presence of a suitable alkylation catalyst such as aluminum chloride, sulfuric acid, phosphoric acid, etc., followed by sulfonation with sulfuric acid and, finally, neutralization of the resulting aromatic sulfonic acid with a divalent metal base. Preferably, the olefin employed in this series of reactions is a high molecular weight olefin having eight or more carbon atoms such as propylene or butylene polymer, mixed polymers or a high molecular weight straight chain olefin such as octylene, dodecylene, etc. An alternate method of preparing the alkyl aromatic starting material involves the preparation of a halogenated paraffinic hydrocarbon such as a chloro paraffin wax and subsequent alkylation of the aromatic hydrocarbon with the halogenated paraffin under conditions to liberate hydrogen halide and form a mono-, di- or tri-wax alkylated aromatic hydrocarbon which is subsequently sulfonated and neutralized. Barium, calcium, cadmium, and magnesium sulfonate salts may be used as detergents, but the barium compounds are particularly effective in automatic transmission fluids.

The alkaline earth metal petroleum sulfonates are usually employed in the automatic transmission fluids of this invention. The alkaline earth metal petroleum sulfonates are generally used in the form of their basic salts because basic salts enhance the anti-corrosive properties of the resulting transmission fluids in addition to functioning as detergents. Basic alkaline earth metal sulfonates is the term used to designate products resulting from reaction of petroleum sulfonic acids or alkaryl sulfonic acids with an alkaline earth metal hydroxide in such proportions that the resulting mixture contains one free hydroxyl group. "Super" basic alkaline earth metal sulfonates in which the concentration of metal is higher than calculated from the formula of the product containing one free hydroxyl group are prepared from an excess of alkaline earth metal hydroxide, petroleum sulfonic acid, a polar oxygenated hydrocarbon such as phenol and a weakly acidic organic promoter such as nitropropane. The "super" basic sulfonates are also used as detergents in automatic transmission fluids.

A particularly preferred detergent used in the formulation of automatic transmission fluids characterized by excellent "anti-squawk" properties in addition to high viscosity index and anti-foam properties is a basic barium petroleum sulfonate. A superior automatic transmission fluid characterized by excellent "anti-squawk," anti-wear and anti-corrosive properties which meets the rigid requirements prescribed by the manufacturers of automatic transmissions uses basic barium petroleum sulfonate as the detergent.

The barium salts of olefin-$P_2S_5$ reaction products also possess detergent properties and are sometimes used in combination with petroleum sulfonate salts in automatic transmission fluids. A typical barium salt of this type is prepared as follows:

An olefin, for example, a $C_9$ propylene polymer, and $P_2S_5$ are reacted in the optional presence of a solvent at a temperature of 250 to 400° F. with a mol of $P_2S_5$ being used for each double bond present in the olefin; the reaction product is neutralized with barium hydroxide in a hydrocarbon solvent such as xylene under reflux conditions; the resulting barium salt is isolated from the xylene solvent. A good detergent combination comprises about 75 percent basic barium petroleum sulfonate and about 25 percent barium salt of $C_9$ propylene polymer-$P_2S_5$ reaction product.

The detergent constitutes 1 to 6 weight percent of the finished automatic transmission fluid with concentrations generally falling within the range of 2 to 5 weight percent.

The corrosion inhibitors employed in the "squawk"-free automatic transmission fluids of this invention are broadly classified as sulfur-containing organic compounds, which term includes dithiophosphate salts, sulfurized olefins, neutralized sulfurized olefins and mixtures thereof. Dithiophosphate salts are prepared by the reaction of alcohols or phenols with phosphorus pentasulfide and subsequent neutralization of the acidic reaction product with a divalent metal hydroxide or carbonate. Sulfurized olefins are obtained by the reaction of olefins including olefinic polymers and terpenes with sulfur, hydrogen sulfide or phosphorus pentasulfide; the neutral modifications result from oxidation or reaction with caustic of the foregoing reaction products.

Dithiophosphate metal salts, particularly calcium and zinc salts, are produced by the reaction of metal hydroxide, oxide, or metal, per se, with alkyl thiophosphates resulting from the reaction of monohydroxy alcohols with phosphorus pentasulfide. There appears to be some controversy over the nature of the alkyl thiophosphates resulting from the reaction of monohydroxy alcohols with phosphorus pentasulfide, but it is believed that the major reaction product has the following composition:

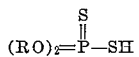

wherein R designates the radical of the alcohol used in the reaction. The salts are formed from the phosphorus pentasulfide alcohol condensation products by reaction with an excess of powdered divalent metal, metal oxide or hydroxide at a temperature in the neighborhood of 200 to 350° F. Preferred alcohols for reaction with phosphorus pentasulfide are methyl isobutyl carbinol, isopropyl alcohol, lauryl alcohol, cyclohexanol, methyl cyclohexanol and capryl alcohol. The zinc salts of alkyl thiophosphates formed by reaction of $P_2S_5$ with one of the aforementioned alcohols have proven to be particularly excellent corrosion inhibitors in automatic transmission fluid. A lauryl alcohol-$P_2S_5$ zinc reaction product is a particularly effective corrosion inhibitor.

Sulfurized olefins and the neutralized modifications thereof result from the reaction of $C_8$ to $C_{20}$ aliphatic olefins or a terpene with sulfur, hydrogen sulfide or phosphorus pentasulfide. For example, sulfurized terpenes result from the reaction of sulfur, hydrogen sulfide or phosphorus pentasulfide with compounds such as pinene, limonene, terpinene, dipentene and mixtures thereof. $C_9$ to $C_{18}$ olefinic polymers prepared by the polymerization of propylene, butylene or mixtures thereof are also used in the preparation of sulfurized olefin corrosion inhibitors. The products designated neutralized sulfurized olefins are obtained by adding a dry neutralizing agent such as potassium hydroxide, sodium hydroxide, sodium carbonate, sodium bicarbonate, calcium oxide, etc. to the sulfurized olefin, preferably at an elevated temperature of 100 to about 400° F. and preferably in a non-oxidizing atmosphere. The neutralization can also be effected by contacting the reaction product obtained by sulfur, hydrogen sulfide or phosphorus pentasulfide sulfurization with a solution of neutralizing agent, e.g., potassium hydroxide dissolved in alcohol. Neutralization can also be effected by oxidation of the sulfurization product; oxidation with 30 percent $H_2O_2$ is normally used.

A preferred sulfurized olefin is obtained by reacting a terpene mixture comprising mainly dipentene with about 10 percent $P_2S_5$. After the reaction is completed, excess phosphorus pentasulfide is separated from the reaction product by filtering or by diluting with a solvent such as hexane, filtering and distilling off the solvent. The reaction mixture may be further treated by blowing with steam or nitrogen at an elevated temperature. Neutralization of the phosphorus pentasulfide-terpene reaction product may be effected by contact of the reaction product with an alcoholic solution of potassium hydroxide. Examples of commercial products of this type are LZ-92 sold by Lubrizol Corporation and S-394-C sold by Monsanto.

The corrosion inhibitor usually constitutes between 1 and 4 weight percent of the total transmission fluid with concentrations of 1½ to 3 percent being preferred. The corrosion inhibitor is usually a divalent metal alkyl thiophosphate alone or in combination with one of the second class of corrosion inhibitors comprising sulfurized olefins and their neutralized modifications. A particularly effective corrosion inhibitor is an 85-15 mixture of zinc alkyl dithiophosphate and a terpene-$P_2S_5$ reaction product. The zinc alkyl dithiophosphate alone is also an effective corrosion inhibitor.

The following examples illustrate the effective anti-squawk properties of hydraulic transmission fluids containing 0.1 to 1.0 weight percent of a dialkyl ester of a dimer acid. The anti-squawk properties are demonstrated in the squawk test which is carried out in a 1948 Cadillac equipped with a 1947 production "Hydra-Matic" transmission. Alternate full and part throttle accelerations are made, with the transmission going through normal shifting. Tests are started with the bulk oil temperature below 100° F. and the oil is allowed to heat up in normal operation. Temperatures are recorded at the beginning of each acceleration and the squawk tendency of the transmission on the second-third upshift is noted. The test is stopped when 10 full throttle squawks on the second-third upshift are recorded. In the case of hydraulic fluids with which little or no squawking is noted, the test is continued for 75 cycles up to a bulk oil temperature of approximately 310° F. before ending the test. In rating the oils, a 0 rating is optimum, 0 to 49 is good, 50 to 149 is fair and 150 to 300 is poor; ratings over 150 fail.

In Example I, a lubricating base oil mixture containing a viscosity index improver, detergent, inhibitor and antifoam agent is compared in the squawk test with the same lubricant composition containing dibutyl ester of linoleic acid dimer.

*Example I*

Two hydraulic fluids were prepared from a base oil mixture comprising 48 percent of a furfural refined, acid-treated, clay-contacted, solvent dewaxed paraffin base distillate having a SUS at 100° F. of 100, 32 percent of an acid-treated naphthenic base distillate having an SUS at 100° F. of 60, and 20 percent of a propane deasphalted, centrifuge dewaxed, clay-contacted paraffin base residuum having an SUS viscosity at 210° F. of 160. Viscosity index improver, detergent, corrosion inhibitor and silicone anti-foam agent were added to both fluids which differed only in the presence of 0.5 percent dibutyl ester of linoleic acid dimer in fluid B. The compositions of the fluids in weight percent were as follows:

| | A | B |
|---|---|---|
| Base Oil | 92.5 | 92.0 |
| Basic barium petroleum sulfonate | 2.40 | 2.40 |
| Zinc methyl cyclohexyl dithiophosphate | 1.36 | 1.36 |
| Dipentene-$P^2S_5$ product | 0.24 | 0.24 |
| Acryloid 710 | 3.5 | 3.5 |
| Kerosene concentrate containing 10 g. dimethyl silicone per 100 cc. of solution, p.p.m. | 150 | 150 |
| Dibutyl ester of linoleic acid dimer | None | 0.5 |

Hydraulic fluid A gave a squawk test of 297 while hydraulic fluid B containing dibutyl ester of linoleic acid dimer gave a squawk test of 71.

The tests, in addition to the squawk test, which have been prescribed by the makers of automatic transmissions to evaluate fluids for use therein, are the oven sludge test, the CRC L-4 oxidation test and the cycling test, which are hereafter described before presentation of the rest of the examples.

An oven sludge test is a preliminary screening test to reject compositions which are inferior in respect to high temperature breakdown and sludging and, therefore, incapable of passing the cycling test. This sludge test is run by placing a sample of the fluid in an oven for 125 hours at 250° F., and then measuring the weight percent of sludge formed.

A CRC L-4 oxidation test is run on the fluid at 265° F. crankcase temperature in accordance with conventional procedure. Passing this test requires a copper-lead bearing weight loss below a specified maximum, and a satisfactory CRC rating and piston rating with respect to deposits or engine cleanliness. The acceptable bearing weight loss is 0.300 gram for 2 whole bearings. The piston rating is on a numerical scale from 0 to 10, with 10 representing a perfectly clean piston and lower numbers representing progressively poorer results due to increased varnish and deposits. A piston rating of 8 or above in this test is good. The overall CRC rating is on a basis of 100 for perfect overall cleanliness; a value above 85 is quite satisfactory.

The cycling test is carried out in a production V-8 Oldsmobile engine of 165 H.P. mounted on a regular dynamometer test stand, and driving a dynamometer through a production "Hydra-Matic" transmission. The throttle setting is varied by a cam-solenoid arrangement to provide a cycle of 15 seconds at idling speed and then 45 seconds at full throttle opening. During the full throttle opening the transmission shifts through all four forward speeds and then runs at full throttle speed. Conditions for this test include an average load of 135 H.P., a top speed in fourth gear at full throttle of 3,600 r.p.m., and a transmission oil temperature of 275° F. The test is run for a period of 100 hours, or for a lesser time up until oil failure. Oil failure is defined as that point at which the transmission takes more than 10 seconds to shift into fourth gear (with new satisfactory transmission fluids, the time is usually 4.5 to 6 seconds) or when excessive slippage is noted. After termination of the test, the transmission is disassembled and the condition of the oil and transmission noted. Of particular interest is the condition of the clutch plate facings. Also, close observation of sludge and varnish formation is made.

The following example shows the effect of incorporating the prescribed amount of dialkyl ester of a dimer of ethylenic monocarboxylic aliphatic acids in finished automatic transmission fluids containing viscosity index improver, detergent, corrosion inhibitor, and anti-foam agent.

*Example II*

Two hydraulic fluids were prepared with the base oil mixture employed in Example I and containing substantially similar concentrations of viscosity index improver, corrosion inhibitor, detergent, and anti-foam agent. The only significant difference between the products was the presence of 0.25 percent dialkyl ester of linoleic acid dimer in fluid D.

| | C | D |
|---|---|---|
| Base Oil | 92.50 | 92.05 |
| Acryloid 710 | 3.50 | 3.50 |
| Basic Barium Petroleum Sulfonate | 2.40 | 2.52 |
| Zinc methylcyclohexyl dithiophosphate | 1.36 | 1.43 |
| Dipentene-$P^2S_5$ product | 0.24 | 0.25 |
| Dibutyl ester of linoleic acid dimer | None | 0.25 |
| Kerosene concentrate containing 10 g. dimethyl silicone per 100 cc. of solution, p.p.m. | 150 | 150 |

The following tests were obtained on these two hydraulic fluids:

| | C | D |
|---|---|---|
| Viscosity: | | |
| New Oil— | | |
| SUS at 100° F. (determined) | 200 | 204. |
| SUS at 210° F. (determined) | 50.7 | 50.6. |
| Oil after Cycling Test— | | |
| SUS at 100° F. (determined) | 171 | 178. |
| SUS at 210° F. (determined) | 46.4 | 46.6. |
| Viscosity Index: | | |
| Before Cycling Test | 137 | 134. |
| After Cycling Test | 125 | 124. |
| Flash Point, COC, ° F | 370 | 370. |
| Fire Point, ° F | 400 | 400. |
| Pour Point, ° F | −50 | −50. |
| Corrosion, copper strip, 3 hrs. at 300° F. | Negative | Negative. |
| Detroit Transmission Foam Test | No foam | No foam. |
| Heat Test, 125 hrs. at 250° F | darker, clear slight trace of sludge. | darker, clear slight trace of sludge. |
| CRC L-4 Test: | | |
| Bearing weight loss, grams | .049 | .130. |
| Piston rating | 9.5 | 9.2. |
| Total CRC rating | 93.5 | 92.2. |
| Non-Chatter ("Squawk") Test | 297 | 114. |
| Cycling Test: | | |
| Hours to termination | 100 | 100. |
| Reason for termination | End of Test | End of test. |
| Clutch plate condition after test | Excellent | Good. |

The foregoing examples show that superior anti-squawking automatic transmission fluids are obtained by the incorporation of detergent, viscosity index improvers and corrosion inhibitors in a base oil containing the prescribed amount of a dialkyl ester of a dimer acid obtained by the polymerization of two $C_{12}$ to $C_{24}$ conjugated unsaturated aliphatic monocarboxylic acids. In general, satisfactory squawk-free hydraulic fluids are obtained by utilizing detergent, corrosion inhibitor, viscosity index improver, dialkyl dimerate, squawk suppressor and foam inhibitor within the following concentrations in the finished hydraulic fluid:

| | |
|---|---|
| Dialkyl ester of a dimer acid | 0.1 to 1.0 weight percent. |
| Methacrylate ester polymer | 0.4 to 6.0 weight percent. |
| Sulfonate detergent | 1.0 to 6.0 weight percent. |
| Dithiophosphate salt, sulfurized olefin, neutralized sulfurized olefin or mixture thereof | 1.0 to 4.0 weight percent. |
| Concentrate of silicone foam inhibitor | 50 to 200 p.p.m. |
| Mineral lubricating oil | Balance. |

Obviously, many modifications and variations of the invention, as hereinbefore set forth, may be made without departing from the spirit and scope thereof and, therefore, only such limitations should be imposed as are indicated in the appended claims.

We claim:
1. A hydraulic transmission fluid adapted for automatic transmissions comprising at least 85 weight percent of a mineral lubricating oil, said mineral lubricating oil comprising about 60 to 90 weight percent of a refined distillate oil and 10 to 40 weight percent of a refined residual fraction; and 0.1 to 1.0 weight percent dialkyl ester of a dimer of ethylenic monocarboxylic aliphatic acids of the general formula

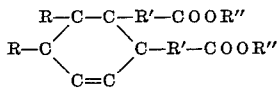

wherein R is a monovalent aliphatic hydrocarbon radical containing 4 to 10 carbon atoms, R' is a divalent aliphatic hydrocarbon radical containing 4 to 10 carbon atoms and R'' is a monovalent aliphatic hydrocarbon radical containing 1 to 10 carbon atoms; said dialkyl ester eliminating squawking without adversely affecting the performance of the fluid in the cycling test.

2. The hydraulic transmission fluid of claim 1 in which said dialkyl ester is present in a concentration of 0.15 to 0.5 weight percent of said hydraulic fluid.

3. The hydraulic transmission fluid of claim 1 in which said dialkyl ester is a dialkyl ester of a dimer of conjugated polyethylenic monocarboxylic aliphatic acids.

4. A hydraulic transmission fluid adapted for automatic transmissions comprising at least 85 weight percent of a mineral lubricating oil, said mineral lubricating oil comprising about 60 to 90 weight percent of a refined distillate oil and 10 to 40 weight percent of a refined residual fraction; and a dialkyl ester of linoleic acid dimer in which the alkyl radical contains 1 to 10 carbon atoms, said dialkyl ester being present in a concentration between 0.1 to 1.0 weight percent whereby squawking is eliminated without adversely affecting the performance of the fluid in the cycling test.

5. The hydraulic transmission fluid of claim 4 in which said dialkyl ester is present in the concentration between 0.15 and 0.5 weight percent.

6. A hydraulic transmission fluid adapted for automatic transmissions comprising at least 85 weight percent of a mineral lubricating oil, said mineral lubricating oil comprising about 60 to 90 weight percent of a refined distillate oil and 10 to 40 weight percent of a refined residual fraction; 0.1 to 1.0 weight percent of a dialkyl ester of a dimer of ethylenic monocarboxylic aliphatic acids of the general formula

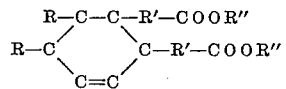

wherein R is a monovalent aliphatic hydrocarbon radical containing 4 to 10 carbon atoms, R' is a divalent aliphatic hydrocarbon radical containing 4 to 10 carbon atoms and R'' is a monovalent aliphatic hydrocarbon radical containing 1 to 10 carbon atoms; said dialkyl ester being present in an amount sufficient to eliminate squawking without adversely affecting the performance of the fluid in the cycling test, 0.4 to 6.0 weight percent of a methacrylate ester polymer as a viscosity index improver, 0.005 to 0.025 weight percent of a silicone polymer concentrate as an anti-foam agent, 1.0 to 6.0 weight percent of a detergent selected from the group consisting of alkaline earth metal sulfonate salts, barium salts of olefin-$P_2S_5$ reaction products and mixtures thereof and 1.0 to 4.0 weight percent of a sulfur-containing organic corrosion inhibitor selected from the group consisting of dithiophosphate salts, sulfurized olefins, neutralized sulfurized olefins and mixtures thereof.

7. The hydraulic transmission fluid of claim 6 in which said dialkyl ester is a dialkyl ester of a dimer of conjugated polyethylenic monocarboxylic aliphatic acids.

8. The hydraulic transmission fluid of claim 6 in which said dialkyl ester is an ester of linoleic acid dimer.

9. A hydraulic transmission fluid adapted for automatic transmissions comprising at least 85 weight percent of a mineral lubricating oil and 0.1 to 1.0 weight percent of a dibutyl ester of linoleic acid dimer; said dibutyl ester eliminating squawking without adversely affecting the performance of the fluid in the cycling test.

10. A hydraulic transmission fluid adapted for automatic transmissions comprising at least 85 weight percent of a mineral lubricating oil, 0.1 to 1.0 weight percent of a dibutyl ester of linoleic acid dimer, said dibutyl ester being present in an amount sufficient to eliminate squawking without adversely affecting the performance of the fluid in the cycling test, 0.4 to 6.0 weight percent of a methacrylate ester polymer as a viscosity index improver, 0.005 to 0.025 weight percent of a silicone polymer concentrate as an anti-foam agent, 1.0 to 6.0 weight percent of a detergent selected from the group consisting of alkaline earth metal sulfonate salts, barium salts and olefin-$P_2S_5$ reaction products and mixtures thereof and 1.0 to 4.0 weight percent of a sulfur-containing corrosion inhibitor selected from the group consisting of dithiophosphonate salts, sulfurized olefins, neutralized sulfurized olefins and mixtures thereof.

11. The hydraulic transmission fluid of claim 10 in which the detergent is a basic barium petroleum sulfonate, the corrosion inhibitor is a mixture of zinc alkyl dithiophosphate and a terpene-$P_2S_5$ reaction product and the dialkyl ester is a dibutyl ester of linoleic acid dimer.

References Cited in the file of this patent

UNITED STATES PATENTS

| | | |
|---|---|---|
| 2,411,178 | Young et al. | Nov. 19, 1946 |
| 2,673,184 | Morway et al. | Mar. 23, 1954 |
| 2,683,120 | Jennings et al. | July 6, 1954 |
| 2,710,842 | Heisig et al. | June 14, 1955 |
| 2,849,399 | Matuszak et al. | Aug. 26, 1958 |

FOREIGN PATENTS

| | | |
|---|---|---|
| 524,528 | Canada | May 1, 1956 |